United States Patent
Sharma et al.

(10) Patent No.: US 10,353,884 B2
(45) Date of Patent: *Jul. 16, 2019

(54) TWO-STAGE FRONT END FOR EXTENT MAP DATABASE

(71) Applicant: NetApp, Inc., Sunnyvale, CA (US)

(72) Inventors: Alok Sharma, Bangalore (IN); Satbir Singh, Bangalore (IN); Sudhanshu Gupta, Bangalore (IN)

(73) Assignee: NetApp Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/601,388

(22) Filed: May 22, 2017

(65) Prior Publication Data
US 2017/0255624 A1    Sep. 7, 2017

Related U.S. Application Data

(63) Continuation of application No. 14/559,317, filed on Dec. 3, 2014, now Pat. No. 9,659,047.

(51) Int. Cl.
*G06F 3/06* (2006.01)
*G06F 16/13* (2019.01)
(Continued)

(52) U.S. Cl.
CPC ........ *G06F 16/2255* (2019.01); *G06F 16/137* (2019.01); *G06F 16/1748* (2019.01);
(Continued)

(58) Field of Classification Search
CPC ........ G06F 3/06; G06F 3/0601; G06F 3/0602; G06F 3/0608; G06F 3/0619;
(Continued)

(56) References Cited

U.S. PATENT DOCUMENTS 6,374,266 B1    4/2002  Shnelvar
6,389,433 B1 *  5/2002  Bolosky .............. G06F 11/1453
                                                        707/749
(Continued)

OTHER PUBLICATIONS

Secure Storage with Replication and Transparent Deduplication; Leontiadis et al.; Proceedings of the Eighth ACM Conference on Data and Application Security and Privacy, pp. 13-23; Mar. 19-21, 2018 (Year: 2018).*

(Continued)

*Primary Examiner* — Daniel C. Chappell
(74) *Attorney, Agent, or Firm* — Cooper Legal Group, LLC (57) ABSTRACT

Multiple key-value stores may be employed to smooth out random updates (based on the extent ID) to the EMAP database. The updates to the EMAP database occur in a two-stage manner: (i) using an append-only log store for the first stage and (ii) using an on-disk hash store for the second stage. The append-only log store is used to convert the random updates to sequential write operations on the EMAP database. Once full, the contents of the log store are sorted and moved to the on-disk hash store, which holds the updates for a transient period of time to enable batching of the updates. Once sufficient batching of the extent map entries are accumulated, those entries are sorted and moved to the EMAP database. Thereafter, the EMAP database can be scanned to find extent map entries having identical checksum bits to perform data deduplication.

20 Claims, 7 Drawing Sheets

(51) Int. Cl.
*G06F 16/21* (2019.01)
*G06F 16/22* (2019.01)
*G06F 16/174* (2019.01)

(52) U.S. Cl.
CPC ........ *G06F 16/217* (2019.01); *G06F 16/2246* (2019.01); *G06F 3/0608* (2013.01); *G06F 3/0641* (2013.01)

(58) Field of Classification Search
CPC ...... G06F 3/0638; G06F 3/064; G06F 3/0641; G06F 3/065; G06F 3/0652; G06F 3/067; G06F 3/0673; G06F 3/0674; G06F 3/0676; G06F 3/0679; G06F 3/068; G06F 3/0685; G06F 3/0686; G06F 3/0688; G06F 3/0689; G06F 11/08; G06F 11/085; G06F 11/10; G06F 11/1004; G06F 11/1008; G06F 11/1044; G06F 11/1064; G06F 11/1068; G06F 11/1072; G06F 11/1446; G06F 11/1453; G06F 17/30067; G06F 17/30327; G06F 17/3033; G11B 20/18

See application file for complete search history.

(56) References Cited

U.S. PATENT DOCUMENTS

| | | | |
|---|---|---|---|
| 6,983,296 B1 * | 1/2006 | Muhlestein | G06F 16/10 707/705 |
| 8,082,231 B1 | 12/2011 | McDaniel et al. | |
| 8,131,687 B2 | 3/2012 | Bates et al. | |
| 8,131,924 B1 | 3/2012 | Frandzel et al. | |
| 8,180,740 B1 | 5/2012 | Stager et al. | |
| 8,209,334 B1 * | 6/2012 | Doerner | G06F 3/061 707/698 |
| 8,285,681 B2 * | 10/2012 | Prahlad | H04L 67/1097 707/640 |
| 8,332,375 B2 | 12/2012 | Chatley et al. | |
| 8,396,905 B2 | 3/2013 | Provenzano | |
| 8,458,425 B2 * | 6/2013 | Tamura | G06F 3/0608 711/166 |
| 8,468,320 B1 | 6/2013 | Stringham | |
| 8,510,279 B1 | 8/2013 | Natanzon et al. | |
| 8,528,085 B1 | 9/2013 | Juels | |
| 8,572,055 B1 | 10/2013 | Wu et al. | |
| 8,600,949 B2 * | 12/2013 | Periyagaram | G06F 3/0608 707/664 |
| 8,620,877 B2 | 12/2013 | Smith | |
| 8,626,723 B2 * | 1/2014 | Ben-Shaul | G06F 3/0608 707/692 |
| 8,768,901 B1 | 7/2014 | Somerville | |
| 8,793,226 B1 | 7/2014 | Yadav et al. | |
| 8,799,601 B1 * | 8/2014 | Chen | G06F 3/0608 711/161 |
| 8,832,034 B1 | 9/2014 | Ramarao | |
| 8,862,559 B2 * | 10/2014 | Jayaraman | G06F 11/1453 707/693 |
| 8,868,520 B1 | 10/2014 | Raghuwanshi et al. | |
| 8,904,120 B1 | 12/2014 | Killamsetti et al. | |
| 8,930,306 B1 | 1/2015 | Ngo et al. | |
| 9,015,181 B2 * | 4/2015 | Kottomtharayil | G06F 11/1451 707/758 |
| 9,152,333 B1 | 10/2015 | Johnston et al. | |
| 9,189,414 B1 | 11/2015 | Shim et al. | |
| 9,262,431 B2 | 2/2016 | Kolodner et al. | |
| 9,268,832 B1 | 2/2016 | Challapalli | |
| 2001/0037323 A1 | 11/2001 | Moulton et al. | |
| 2006/0224846 A1 * | 10/2006 | Amarendran | G06F 3/0605 711/162 |
| 2008/0104081 A1 * | 5/2008 | Mimatsu | G06F 16/10 |
| 2008/0155192 A1 * | 6/2008 | Iitsuka | G06F 16/319 711/114 |
| 2010/0088296 A1 | 4/2010 | Periyagaram et al. | |
| 2010/0250858 A1 | 9/2010 | Cremelie et al. | |
| 2011/0016095 A1 | 1/2011 | Anglin et al. | |
| 2011/0082840 A1 | 4/2011 | Jayaraman | |
| 2012/0084518 A1 | 4/2012 | Vijayan et al. | |
| 2012/0124105 A1 * | 5/2012 | Provenzano | G06F 11/1453 707/813 |
| 2012/0150826 A1 | 6/2012 | Vijayan et al. | |
| 2012/0330903 A1 * | 12/2012 | Periyagaram | G06F 3/0608 707/692 |
| 2013/0166862 A1 | 6/2013 | Huang | |
| 2014/0059015 A1 | 2/2014 | Zinar et al. | |
| 2014/0143213 A1 | 5/2014 | Tal et al. | |
| 2014/0181465 A1 | 6/2014 | Baldwin et al. | |
| 2014/0237202 A1 | 8/2014 | Yamamoto et al. | |
| 2015/0127622 A1 | 5/2015 | Jayaraman | |
| 2016/0026653 A1 | 1/2016 | Caro et al. | |
| 2016/0034201 A1 | 2/2016 | Chambliss et al. | |
| 2016/0070652 A1 * | 3/2016 | Sundararaman | G06F 3/0619 711/154 |
| 2016/0179414 A1 | 6/2016 | Williams et al. | |
| 2016/0292048 A1 * | 10/2016 | Dolan | G06F 3/0608 |
| 2016/0299818 A1 * | 10/2016 | Vijayan | G06F 16/162 |
| 2016/0306708 A1 * | 10/2016 | Prahlad | G06F 11/1453 |

OTHER PUBLICATIONS

Boafft: Distributed Deduplication for Big Data Storage in the Cloud; Luo et al.; IEEE Transactions on Cloud Computing (Early Access); Dec. 23, 2015 (Year: 2015).*

Nature—Inspired enhanced data deduplication for efficient cloud storage; Madhubala et al.; International Conference on Recent Trends in Information Technology; Apr. 10-12, 2014 (Year: 2014).*

BloomStore: Bloom-Filter based memory-efficient key-value store for indexing of data deduplication on flash; Lu et al.; IEEE 28th Symposium on Mass Storage Systems and Technologies (MSST); Apr. 16-20, 2012 (Year: 2012).*

Dutta et al., "Towards 'Intelligent compression' in Streams: A Biased Reservoir Sampling based Bloom Filter Approach"; Proceedings of the 15th International Conference on Extending Database Technology; Mar. 27, 2012; pp. 228-238 (11 pages).

Luo et al., "Boafft; Distributed Deduplication for Big Data Storage in the Cloud" Dec. 23, 2015; IEEE Transactions on Cloud Computing, vol. 61, iss. 99; pp. 1-13 (13 pages).

Wu et al., "Improving Accessing Efficiency of Cloud Storage Using De-Duplication and Feedback Schemes"; IEEE Systems Journal, vol. 8, issue 1; Mar. 2014; pp. 208-218 (11 pages).

* cited by examiner

TWO-STAGE FRONT END FOR EXTENT MAP DATABASE

TECHNICAL FIELD

The present invention relates to storage systems and, more specifically, to a technique for efficiently implementing de-duplication of data in a storage system.

BACKGROUND INFORMATION

A storage system may include one or more storage devices, such as disks, into which information may be entered, and from which information may be obtained, as desired. A storage operating system of the storage system may implement a high-level module, such as a file system, to logically organize the information stored on the disks as a hierarchical structure of storage containers, such as directories, files and/or aggregates having one or more volumes that hold files and/or logical units (LUNs). For example, each "on-disk" file may be implemented as set of data structures, i.e., disk blocks, configured to store information, such as actual data for the file. These data blocks may be organized within a physical volume block number (PVBN) space of the aggregate that is maintained by the file system. Each file system block in the PVBN space may have a one-to-one mapping with an on-disk block within a disk block number (DBN) space.

The storage system may typically retain a plurality of copies of similar data (e.g., duplicate data). Duplication of data may occur when, for example, two or more files store common data or where data is stored at multiple locations within a file. The storage of such duplicate data increases the total consumption of storage space utilized by the storage system and may cause administrators to expand the physical storage space available for use by the system, thereby increasing costs to maintain the storage system. As such, data de-duplication techniques may be implemented to save storage space and reduce costs.

A prior approach for data de-duplication may utilize a fingerprint database that is implemented as a flat file storing a list of fingerprints as an array, wherein each element of the array is a fingerprint entry. A fingerprint may be, for example, a hash or checksum value of a fixed size block of data (e.g., 4 kilobytes). The array may then be utilized to perform data de-duplication operations. Specifically, the fingerprint database may be traversed entirely, from beginning to end, and existing fingerprints stored in the database may be compared with a batch of new fingerprints associated with new blocks of data. A merge-sort operation may then be performed to identify duplicate fingerprints and remove duplicate data.

A disadvantage associated with the prior approach is that there may be substantial overhead (e.g., reading and writing) associated with performing the de-duplication operations. That is for each de-duplication operation, the entire existing fingerprint database may be read from beginning to end, and at the completion of the de-duplication operation, the entire fingerprint database (e.g., flat file) may be overwritten. Additionally, since the database is embodied as a flat file, there may be no means to facilitate lookup operations within the file.

BRIEF DESCRIPTION OF THE DRAWINGS

The above and further advantages of the subject matter herein may be better understood by referring to the following description in conjunction with the accompanying drawings in which like reference numerals indicate identically or functionally similar elements, of which.

OVERVIEW

The subject matter herein is directed to a technique for efficiently performing de-duplication of data in a storage system. The storage system may include a file system configured to logically organize the data as data containers that include one or more extents stored on one or more volumes of an aggregate of the storage system. Illustratively, each extent is a variable number of file system blocks that is identified by an extent identifier (ID) calculated on data referenced by the blocks. A buffer tree of a data container, such as a file, may include file system blocks, such as indirect (e.g., level 1) blocks that contain pointers (e.g., PVBNs or PVBN identifiers such as extent IDs) that reference data blocks used to store data of the file. An extent map (EMAP) database may include one or more extent map entries configured to map the extent IDs to PVBNs. Each extent ID may be apportioned into a most significant bit (MSB) portion, i.e., checksum bits, and a least significant bit (LSB) portion, i.e., duplicate bits. A hash may be applied to the data of the extent to calculate the checksum bits, which illustratively represent a fingerprint of the data in the extent. The duplicate bits may be configured to denote any reoccurrence of the checksum bits in the EMAP database, i.e., whether there is an existing extent with potentially identical data in a volume of the aggregate.

The EMAP database may be organized as a B+ tree data structure with a plurality of nodes. Each extent map entry may be inserted, e.g., as an update on a node (i.e., leaf node) having one or more key/value pairs, wherein the key is the extent ID and the value is the PVBN. Insertions (i.e., updates) to the EMAP database utilize the extent ID (key) to access the leaf node, which may include a donor and one or more recipients configured to share the extent (i.e., block sharing of extent). Illustratively, the first extent map entry (having calculated checksum bits and duplicate bits equal to zero) of the node may be the donor and any subsequent extent map entries (having the same calculated checksum bits and incremented duplicate bits) may be recipients.

For example, assume data of one or more write requests received at the storage system is organized into an new extent having data that is identical to the data of an existing extent in the system. Hashing of the data generates the checksum bits of the extent ID of a new extent map entry that matches the checksum bits of an extent ID of the existing extent map entry. Accordingly, the duplicate bits of the new extent map entry are incremented when inserting the new entry into the EMAP database, thus denoting a potential duplicate of the existing extent. Specifically, in response to matching of the checksum bits of the extent IDs, the new extent map entry may be inserted as an update to the leaf node, which may be further updated (e.g., as dirty) with a maximum score equal to the greatest duplicate bits value, or the total number of entries on the leaf node. Each leaf node may accumulate the duplicate bits, e.g., as a change log of extent IDs inserted into the tree/node to create the maximum score representing the total number of recipients outstanding on that node. The maximum score may then be used to prioritize de-duplication (scrubbing) on the node.

Multiple key-value stores may be employed to smooth out random updates (based on the extent ID) to the EMAP database. Illustratively, the updates to the EMAP database occur in a two-stage manner: (i) using an append-only log store for the first stage and (ii) using an on-disk hash store for the second stage. The append-only log store may be employed to convert the random updates to sequential write operations on the EMAP database. Once full, the contents of the log store are sorted and moved to the on-disk hash store, which holds the updates for a transient period of time to enable batching of the updates. Once sufficient batching of the extent map entries are accumulated, those entries are sorted and moved to the EMAP database. Thereafter, the EMAP database can be scanned to find extent map entries having identical checksum bits to perform data deduplication. In addition, a lookup interface, based on partial key cuckoo hash, is provided to search for entries loaded into the stores to perform data deduplication.

DESCRIPTION

Figure 1:
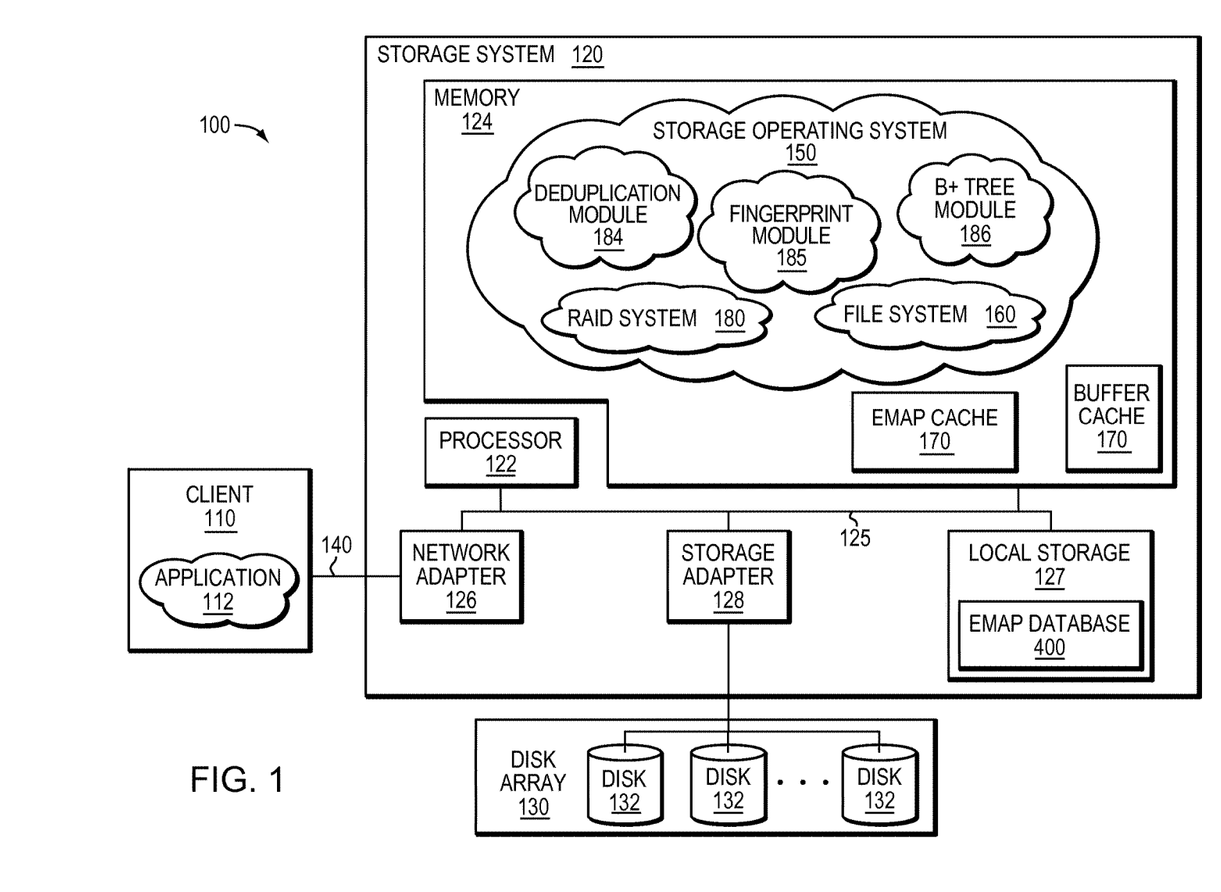
FIG. 1 is a block diagram of an environment including a storage system.

FIG. 1 is a block diagram of an environment 100 including a storage system 120 that may be advantageously used with the subject matter herein. The storage system may be a computer that provides storage service relating to the organization of information on storage devices, such as disks 132, of one more storage arrays 130. The storage system 120 may include a processor 122, a memory 124, a network adapter 126, local storage 127 and one or more storage adapters 128 connected by a system interconnect 125, such as bus. The local storage 127 may include one or more storage devices, such as solid state disks (SSDs), utilized by the system to persistently store, e.g., an extent map (EMAP) database 400 provided by one or more processes that execute as user or kernel mode processes on the system. Illustratively, the SSDs may be embodied as flash storage devices based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be used. The storage system 120 may also include a storage operating system 150 that implements a high-level module, such as a file system 160, to logically organize the information as a hierarchical structure of storage containers, such as directories, files and/or aggregates having one or more volumes that hold files and/or logical units (LUNs) on the disks 132.

The storage operating system 150 may further implement a fingerprint module 185, a B+ tree module 186, and a deduplication module 184 that may communicate with each other using message passing such as Inter-Process Communication (IPC), as known by those skilled in the art. The fingerprint module 185 may generate a fingerprint for one or more blocks of data of an extent that may be inserted into the EMAP database configured as a B+ tree data structure 400, as described below. The B+ tree module 186 and the deduplication module 184 may execute a data duplication process periodically, for example, in response to a command from an administrator or user. Specifically, and in response to the command, the B+ tree module 186 may traverse the B+ tree data structure to identify leaf nodes storing entries having duplicate fingerprints. The B+ tree module 186 may then communicate information, associated with the duplicate fingerprint entries, to the deduplication module 184, which may then identify and remove duplicate data blocks stored as an extent on disk 130 that correspond to the identified duplicate fingerprints. The data deduplication procedure, implemented by the deduplication module 184, may modify pointers within indirect blocks to point to a single data block instead of multiple data blocks containing identical data. An example of data de-duplication is described in U.S. Pat. No. 8,849,767, entitled Method and Apparatus for Identifying and Eliminating Duplicate Data Blocks and Sharing Data Blocks in a Storage System, filed on Apr. 13, 2005.

The memory 124 may include storage locations that are addressable by the processor and adapters for storing software program code. A portion of the memory may be further organized as a buffer cache 170 for storing certain data structures associated with the subject matter herein. The processor and adapters may, in turn, include processing elements and/or logic circuitry configured to execute the software code and manipulate the data structures. Storage operating system 150, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the technique described herein. Also, while the subject matter herein is described in terms of software program code and computers, e.g., applications, programs stored in memory, the code/programs may alternatively be embodied as modules consisting of hardware, software, firmware or combinations thereof.

The network adapter 126 may include the mechanical, electrical and signaling circuitry needed to connect the storage system 120 to a client 110 over a computer network 140, which may include a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 may cooperate with the storage operating system 150 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the storage devices, such as disks 132, of array 130. The storage adapter 128 may include input/output (I/O) interface circuitry that couples to the devices over an I/O interconnect arrangement, such as a conventional high-performance, FC serial link topology.

Storage of information on array 130 may be implemented as one or more virtual volumes (hereinafter "volumes") that include a collection of physical storage devices (i.e., disks 132) cooperating to define an overall logical arrangement of virtual volume block number (VVBN) space on the volume. The disks may be organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of disks in the RAID group, and the appropriate storing of parity information with respect to the striped data. An illustrative example of a RAID implementation is a RAID-4 level implementation, although it should be understood that other types and levels of RAID implementations may be used herein.

A RAID system 180 of the storage operating system 150 may organize the RAID groups into one large "physical" disk (i.e., a physical volume), such that the disk blocks are concatenated across all disks of all RAID groups. The volumes maintained by the file system 160 may then be "disposed over" (spread over) the physical volume maintained by the RAID system 180. Illustratively, the underlying physical volume is an aggregate including one or more groups of disks, such as RAID groups, of the storage system. The aggregate has its own physical volume block number (PVBN) space and maintains metadata, such as block allocation structures, within that PVBN space. An example of a file system layout that apportions an aggregate into one or more volumes of a storage system is described in U.S. Pat. No. 7,409,494 titled, Extension of Write Anywhere File System Layout, filed on Apr. 30, 2004.

To facilitate access to the storage devices, the storage operating system 150 implements the file system 160 (e.g., a write anywhere file system) that cooperates with virtualization modules to "virtualize" the storage space provided by devices. The file system 160 logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named LUNs.

The storage operating system 150 is the NetApp® Data ONTAP™ operating system available from Network Appliance, Inc., Sunnyvale, Calif. that may implement a Write Anywhere File Layout (WAFL™) file system. However, it is expressly contemplated that any appropriate storage operating system and file system may be enhanced for use in accordance with the technique described herein. For example, the technique described herein illustratively employs a MetaWAFL file system, which is a scalable WAFL file system upgrade implementation. Illustratively, the file system 160 may be a message-based system that provides logical volume management capabilities for use in access to the information stored on the storage devices. The file system 160 may illustratively have an on-disk format representation that is block-based using, e.g., 4 kilobyte (kB) blocks and using index nodes ("inodes") to identify files and file attributes (such as creation time, access permissions, size and block location). The file system may use files to store metadata describing the layout of its file system; these metadata files include, among others, an inode file. A file handle, i.e., an identifier that includes an inode number, may be used to retrieve an inode from the storage devices.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including a MetaWAFL layer to implement the MetaWAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance is described in U.S. patent application Ser. No. 10/215,917 titled, Multi-Protocol Storage Appliance that provides Integrated Support for File and Block Access Protocols, filed on Aug. 8, 2002. Moreover, the subject matter described herein can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
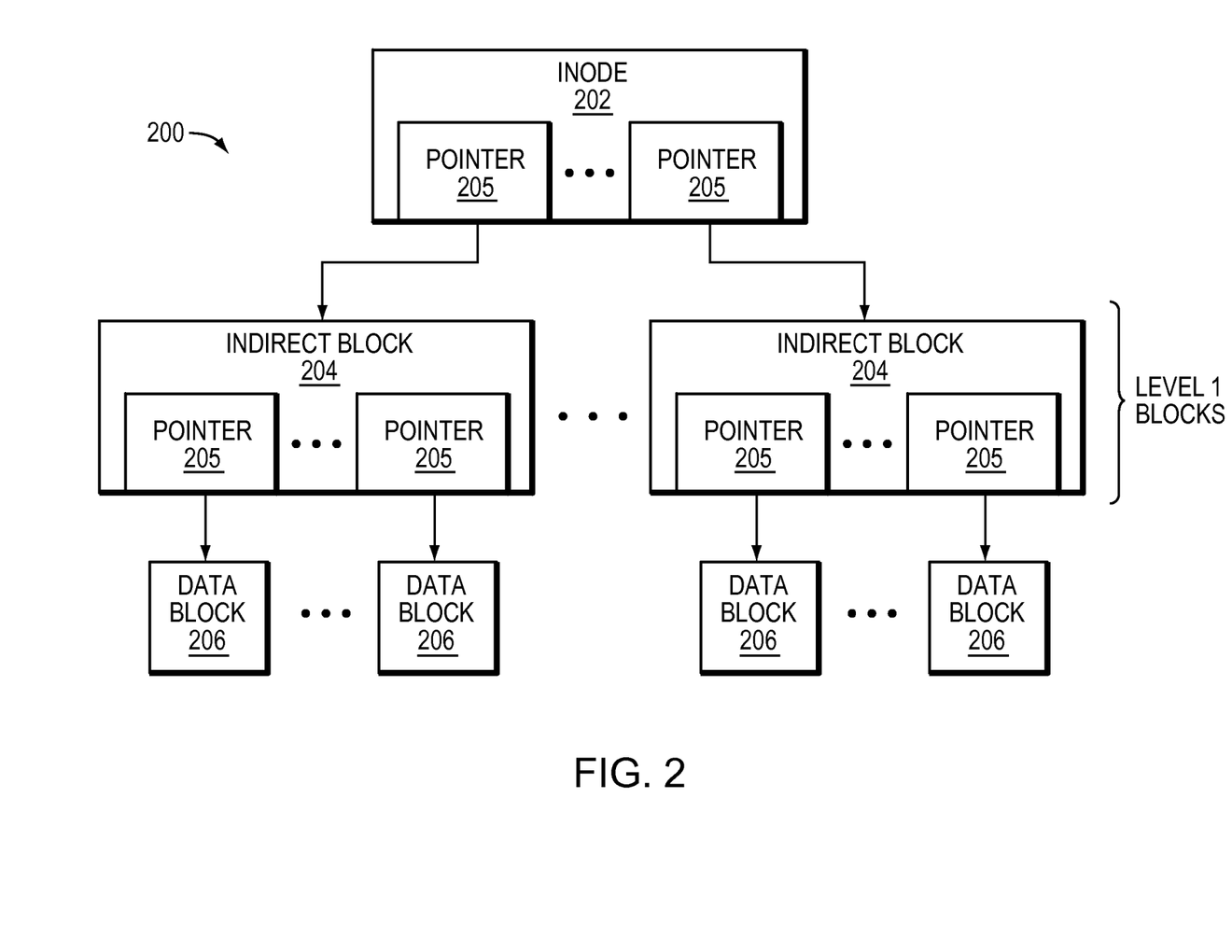
FIG. 2 is a block diagram of a buffer tree of a data container, such as a file.

FIG. 2 is a block diagram of a buffer tree of a data container, such as a file, that may be advantageously used with the subject matter herein. The buffer tree 200 is an internal representation of blocks for a file loaded into the buffer cache 170 and maintained by the file system 160. A root (top-level) inode 202, such as an embedded inode, references indirect (e.g., level 1) blocks 204. The indirect blocks (and inode) contain pointers 205 that ultimately reference data blocks 206 used to store the actual data of the file. That is, the data of the file are contained in data blocks and the locations of these blocks are stored in the indirect blocks of the file. Each level 1 indirect block 204 may contain pointers to data blocks that may be located on the disks 132.

Each volume may be a separate file system that is "mingled" onto a common set of storage in the aggregate by the storage operating system 150. The RAID system 180 may construct a raid topology structure for the aggregate that guides the file system when performing write allocation. In the WAFL file system implementation, the RAID system 180 also presents a PVBN-to-disk, DBN mapping to the file system 160. Illustratively, PVBNs are used as block pointers within buffer trees of files stored in a volume. The use of PVBNs avoids latency associated with translations from VVBNs-to-PVBNs, e.g., when servicing file system (such as NFS, CIFS) requests. Translation from PVBN-to-disk, DBN occurs at the file system/RAID system boundary of the storage operating system 150.

The subject matter herein is directed to a technique for efficiently performing de-duplication of data in storage system 120. As noted, the file system may be configured to logically organize the data as data containers that include one or more extents stored on one or more volumes of an aggregate of the storage system. Illustratively, each extent is a variable number of file system blocks that is identified by an extent identifier (ID) calculated on data referenced by the blocks. The buffer tree 200 may include file system blocks, such as indirect (e.g., level 1) blocks that contain pointers (e.g., PVBNs or PVBN identifiers, such as extent IDs) that reference data blocks used to store data of the file. In the WAFL file system implementation, a container file is illustratively a file in the aggregate that contains all blocks used by the aggregate. As a file, the container file includes a top-level inode that references level 1 (indirect) blocks, which ultimately reference data blocks used by the aggregate. The level 1 indirect blocks contain the PVBNs for blocks in the container file and, thus, "map" VVBNs-to-PVBNs of the aggregate. These level 1 indirect blocks of the container file may be configured as a "container map" for the aggregate that provides block pointers from VVBNs to PVBN locations on disk.

Figure 4:
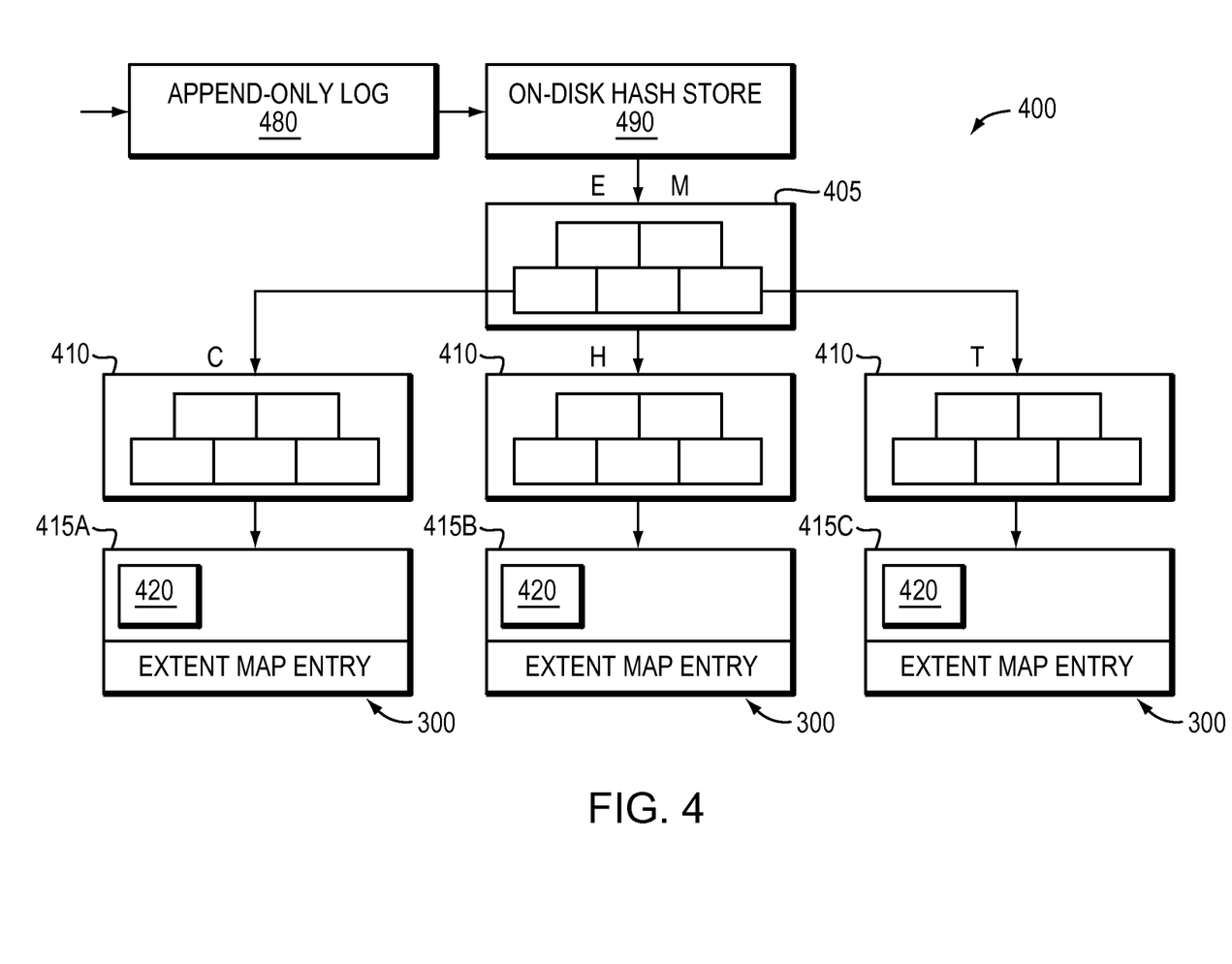
FIG. 4 is a block diagram of an EMAP database configured as a B+ tree data structure.

In accordance with the MetaWAFL file system implementation, the container file is replaced with an EMAP data structure configured as the EMAP database 400, which may include one or more extent map entries configured to map the extent IDs to PVBNs. That is, the extent map entries of the EMAP database are enhanced to replace VVBNs with extent IDs. To avoid latencies associated with translations from extent ID-to-PVBNs, a small in-memory (incore) cache of frequently accessed extent ID/PVBN pairs (i.e., an EMAP cache 190) may be used. Each extent ID may be apportioned into a most significant bit (MSB) portion, i.e., checksum bits, and a least significant bit (LSB) portion, i.e., duplicate bits. A hash may be applied to the data of the extent to calculate the checksum bits, which illustratively represent a fingerprint of the data in the extent. The duplicate bits may be configured to denote any reoccurrence of the checksum bits in the EMAP database, i.e., whether there is an existing extent with potentially identical data in a volume of the aggregate.

Figure 3:
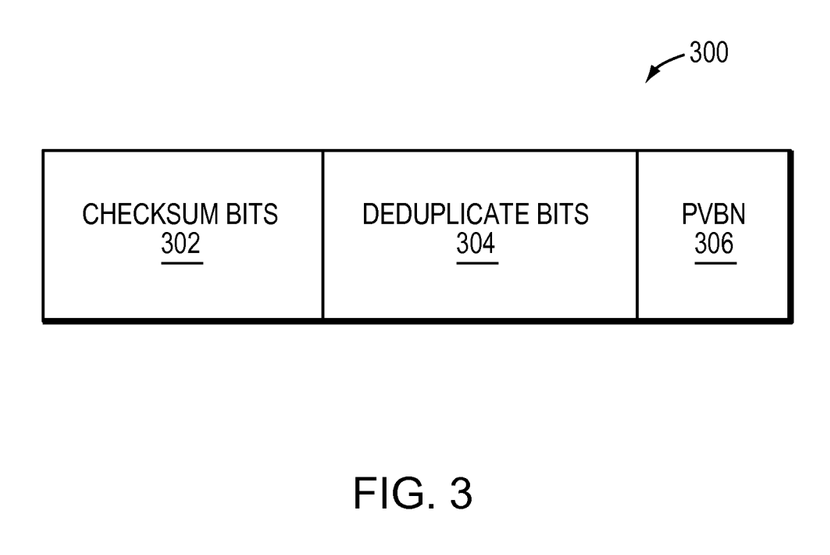
FIG. 3 is a block diagram of an extent map entry.

FIG. 3 is a block diagram of an extent map entry 300 that stores the Extent ID for an extent and the PVBN associated with the data stored in the extent. The Extent ID is divided into two parts: the checksum bits that are stored in field 302 of the extent map entry 300 and the duplicate bits that are stored in field 304 of the extent map entry 300. In addition, the PVBN associated with the data is stored in field 306. The checksum bits represent a fingerprint for the data stored in the extent while the duplicate bits denote any reoccurrence of the same checksum bits. Specifically, a hash is applied by, for example, the fingerprint module 185, on the data in the extent to generate a checksum (e.g., calculate the fingerprint) for the data to be stored in field 302. For example, the checksum may be computed utilizing a Fletcher checksum, hash, or CRC to provide adequate spanning of an extent ID space and to create the checksum bits stored in field 302. Thus, if the checksum calculated by fingerprint module 185 produces unique checksum bits to be stored in field 302 of extent map entry 300, the duplicate bits stored in field 304 of the extent map entry have a value of 0. Subsequent write operations of the same data would thus produce the same checksum bits stored in field 302, but would have different duplicate bits stored in field 304 for the extend ID. Specifically, for each subsequent write that is received for the same data having the same checksum bits stored in field 302, the duplicate bits stored in field 304 are incremented, by, for example, the fingerprint module 185. For example, if there are four extent map entries 300 for the same data, those four extent map entries may have the same checksum bits stored in field 302, and may have four different duplicate bits stored in field 304. Illustratively, the duplicate bits stored in field 304 for the four respective extent map entries 300 may be 0, 1, 2 and 3.

FIG. 4 is a block diagram of the EMAP database configured as a B+ tree data structure 400 configured to store the extent map entries 300. Although reference is made to a B+ tree data structure, it will be apparent to those skilled in the art that other data structures, such as AVL trees, Red-Black trees, and heaps (partially sorted trees), may be advantageously used with the subject matter described herein. The B+ tree data structure 400 includes a root node 405, one or more internal nodes 410 and a plurality of leaf nodes (leaves) 415A, 415B, and 415C, each which may store one or more extent map entries 300.

In addition, each leaf node may include a flag or field 420 having one or more bits that may be marked or "dirtied" (e.g., changed from 0 to 1) indicating that the leaf node stores a plurality of extent map entries 300 with checksum bits (stored in field 302) that are the same (e.g., potentially duplicate data). For example, when at least two extent map entries having the same checksum bits are stored on the same leaf node 415, the one or more bits in the field 420 may be marked as dirty. In addition, the remaining bits in field 420 may be utilized to store a value or "score" for leaf node. The score on the dirty leaf node may be equal to the highest duplicate bit value of an extent map entry stored on the leaf node, or alternatively, may be equal to a total number of extent entries stored on leaf node (e.g., where there are at least two extent map entries stored on the same leaf node having different checksum bits).

The storage of extent map entries within the B+ tree data structure 400 is performed in a manner that is efficient to accomplish searching within the B+ tree data structure. That is, the B+ tree data structure has certain properties that include storage of all extent map entries in leaf nodes (415A, 415B, and 415C) and storage of the leaf nodes as sequentially accessible.

Specifically, multiple key-value stores may be employed as front-end stages to smooth out random updates (based on the extent ID) to the EMAP database. Illustratively, the updates to the EMAP database occur in a two-stage manner: (i) using an append-only log store 480 for the first stage and (ii) using an on-disk hash store 490 for the second stage. The append-only log store 480 is a key-value store employed to convert the random updates to sequential write operations on the EMAP database configured as the B+ tree data structure 400. Once full, the contents of the log store are sorted and moved to the on-disk hash store 490, which is a key-value store configured to hold the updates for a transient period of time to enable batching of the updates. Once sufficient batching of the extent map entries are accumulated, those entries are sorted and moved to the B+ tree data structure

400. A lookup interface based on partial key cuckoo hash may be provided to search for entries loaded into the key-value stores to perform data deduplication. While updates/insertion progresses through the front-end stages to the B+ tree, the lookup interface illustratively resides in memory (incore) of the storage system.

Illustratively, the extent map entries are moved to the B+ tree data structure utilizing the extent ID. Specifically, the value of the checksum bits (e.g., a fingerprint based on the checksum of the data in the extent) stored in field 302 of extent map entry 300 may be utilized to determine where the extent map entry may be inserted and stored on the B+ tree data structure 400. The B+ tree module 186 may insert and store the extent map entries in the B+ tree data structure. For example, and for purposes of depiction and description, the root node 405 may include two threshold values, "E" and "M" illustratively representative of the calculated fingerprints, and the internal nodes 410 may include other representative threshold values such as "C", "H", and "T", respectively. If the value of a calculated checksum bits stored in section 302 of extent map entry 300 is less than "E" and "M", such as "B", the extent map entry 300 may be inserted and stored on particular leaf node 415A at the position based on the thresholds of the root node 405 and the internal node 410 (e.g., "C"). If the value of the calculated checksum bits stored in section 302 of the extent map entry 300 is between "E" and "M", the extent map entry 300 may be inserted and stored at leaf node 415B based on the thresholds of the root node 405 and the internal node 410 (e.g., "H"). Moreover, if the of the calculated checksum bits stored in section 302 of the extent map entry 300 is greater than "E" and "M", the extent map entry 300 may be inserted and stored at leaf 415C based on the thresholds of the root node 405 and the internal node 410 (e.g., "T"). Advantageously, extent map entries 300 are inserted and stored on the B+ tree data structure that provides for searching the B+ tree data structure in an efficient manner.

Illustratively, it is noted that extent map entries 300 having the same checksum bits stored in field 302 are stored on the same leaf node. However, extent map entries 300 having different checksum bits stored in section 302 may also be stored on the same node because each leaf node of the B+ tree represents a range of values. For example, when new checksum bits are calculated for a new extent map entry 300, the B+ tree data structure 400 may be searched, by the B+ tree module 186, for identical checksum bits for an existing extent map entry 300 already stored on the B+ tree data structure. If identical checksum bits of the existing extent map entry 300 are found in the B+ tree data structure, the new extent map entry 300 is stored on the same leaf node as that of the existing extent map entry 300.

Further, it is noted that although the new extent map entry 300 and the existing extent entry 300 have the same checksum bits stored in field 302, the duplicate bits stored in field 304 of the new extent map entry and the existing extent map entry are different. Illustratively, the existing extent entry 300 may have a duplicate bits value of 0 (e.g., the first instance of the checksum bits representing unique data) and the new extent map entry 300 may have a duplicate bits value of 1. If the same checksum bits of the existing extent map entry 300 are not found, the new extent map entry 300 is stored on a particular leaf node, in the manner described above. It is noted that the particular leaf node on which the new extent map entry is stored is based on a value of the checksum bits.

Figure 5:
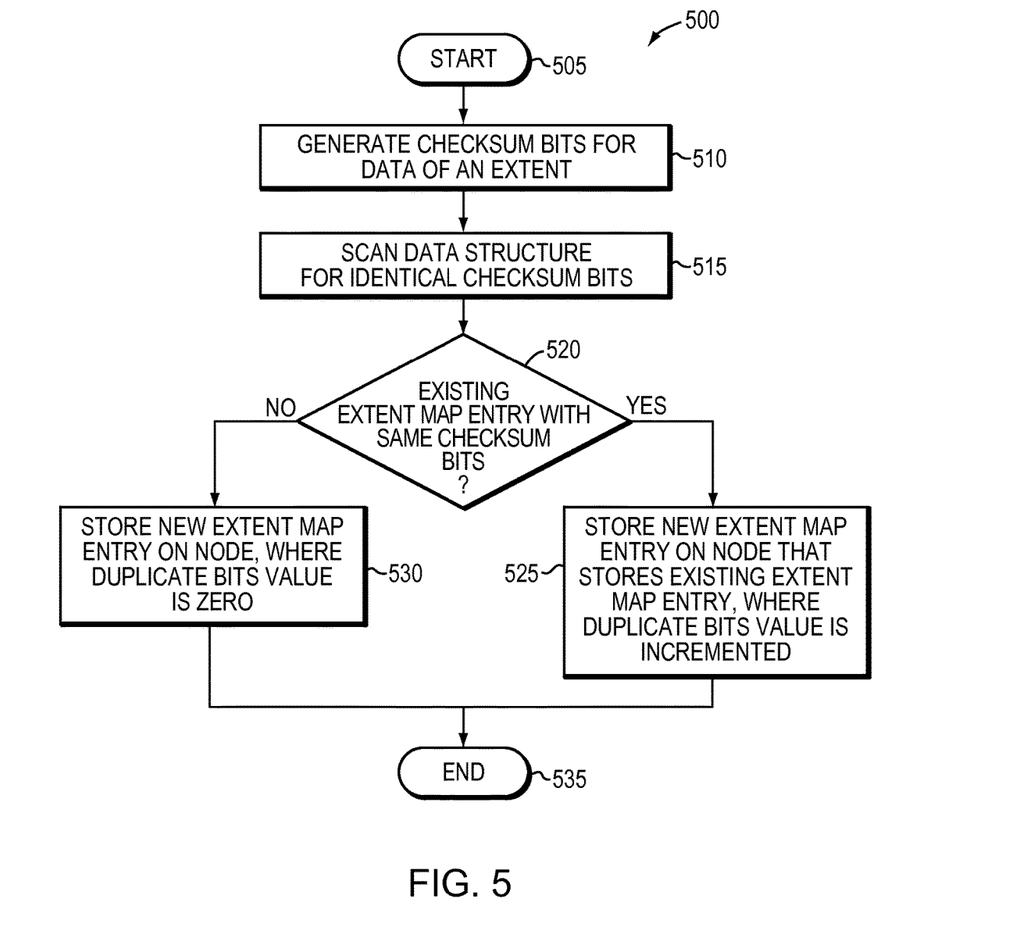
FIG. 5 is a procedure for inserting a new extent map entry into the B+ tree data structure.

FIG. 5 is a flowchart detailing the steps of a procedure 500 for inserting a new extent map entry 300 into the B+ tree data structure 400, after, for example, sufficient batching of the extent map entries are accumulated in the on-disk hash store 490. The procedure starts at step 505 and continues at step 510 where a checksum for data of an extent is generated for a new extent entry 300, by, for example, the fingerprint module 185. Specifically, the checksum of the data represents the checksum bits to be stored in field 302 of the new extent map entry 300 for insertion into B+ tree data structure 400. The procedure continues to step 515, where the B+ tree data structure is scanned and searched for identical checksum bits of an existing extent map entry 300 already stored in the B+ tree data structure. Specifically, the B+ tree data structure 400 is traversed, by the B+ tree module 186, in the manner described above utilizing the checksum bits (e.g., fingerprint of the data) for the new extent map entry 300. At step 520, it is determined whether an existing extent map entry exits with the same checksum bits.

In response to determining that an existing extent map entry already stored on the B+ tree data structure has the same checksum bits stored in field 302, the procedure continues to step 525 and the new extent map entry 300 is stored, by the B+ tree module 186, on the same leaf node on which the existing extent map entry is stored and the duplicate bits value for the new extent map entry 300 is incremented. It is noted that although the new extent map entry 300 and the existing extent map entry have the same checksum bits stored in field 302, they have different duplicate bits stored in field 304. Illustratively, all entries on a leaf node having the same checksum bits have different duplicate bits stored in field 304, where the duplicate bits are incremented as more extent map entries are added to the leaf node. In addition, it is noted that the leaf node, storing the new extent map entry and the existing extent map entry, is marked as dirty indicating the potential of duplicate checksum bits. For example, the one or more bits in field 420 of the leaf node 415 may be marked with a value or score indicated in the one or more remaining bits of field 420. Illustratively, the score on the dirty leaf node may equal the highest duplicate bit value of an extent map entry stored on the leaf node, or alternatively, may equal a total number of extent entries stored on leaf node (e.g., where there are at least two extent map entries stored on the same leaf node having different checksum bits part).

In response to determining, by the B+ tree module 186, that an existing extent map entry having the same checksum bits stored in field 302 is not stored on the B+ tree data structure, the procedure continues to step 530 and the new extent map entry 300 is inserted and stored, by the B+ tree module 186, on a particular leaf node of the B+ tree data structure 400 in the manner described above. The duplicate bits value for the next extent map entry 300 is illustratively zero, since it is the first instance of the checksum bits. Based on the calculated checksum bits stored in field 302, the new extent map entry 300 is stored on a particular leaf node of the B+ tree data structure. The procedure ends at step 535.

Figure 6:
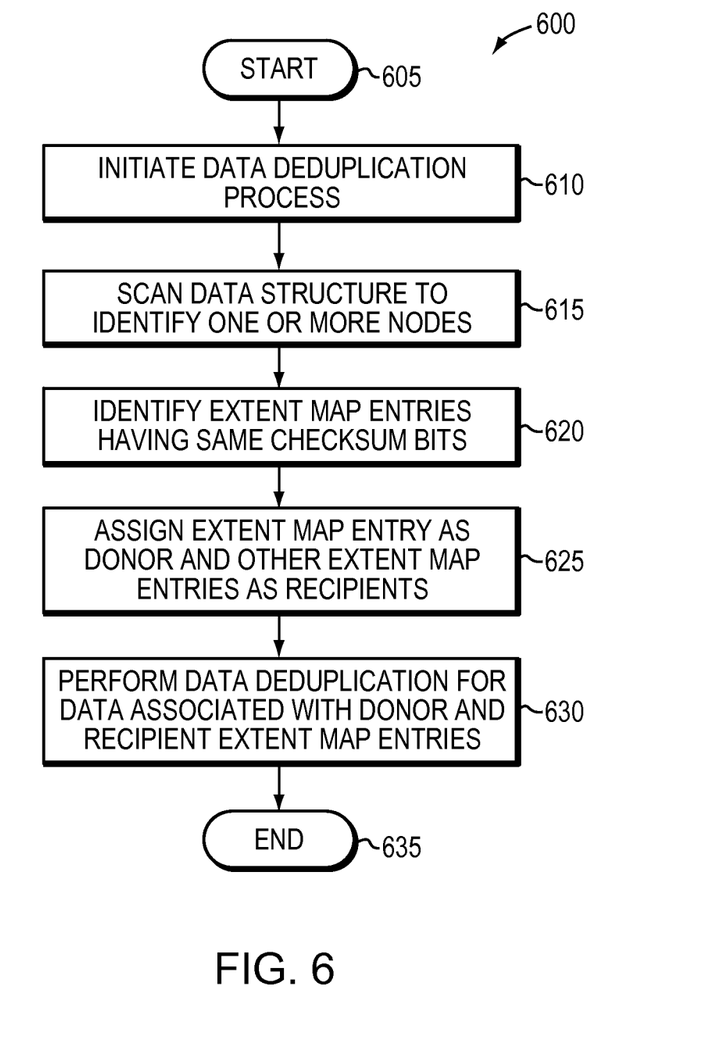
FIG. 6 is a flowchart detailing the steps of a procedure for post-processing data deduplication.

FIG. 6 is a flowchart detailing the steps of a procedure 600 for performing post-processing data deduplication. The procedure starts at step 605 and continues at step 610 where data deduplication process is initiated. Illustratively, an administrator may input a command utilizing client 110 to initiate the data deduplication process. In response to initiating the data deduplication process, the procedure continues to step 615 when the B+ tree data structure is scanned to identify one or more leaf nodes. The B+ tree module 186 may traverse the B+ tree data structure and find one or more leaf nodes having a score stored in field 420 that satisfies a condition. For example, B+ tree module 186 may compare the score stored in field 420 for each leaf node with a threshold value to determine the one or more leaf nodes that have a score that is greater than or equal to the threshold value. In response to identifying the leaf nodes, the procedure continues to step 620 where extent map entries, stored in the leaf having the same checksum bits stored in field 302, are identified. For example, if there are 3 extent map entries 300 that have the same checksum bits stored in field 302, those extent map entries 300 may have different duplicate bits stored in section 304 (e.g., 0, 1, 2).

In response to identifying the one or more extent map entries, the procedure continues to step 625 where an extent map entry is assigned as a donor and the other extent map entries, having the same checksum bits stored in field 302, are assigned as recipients. For example, the extent map entry having the duplicate bits value of 0 is assigned as a donor and the other 2 extent map entries, having the duplicate bits value of 1 and 2, are assigned as recipients. The donor and recipient share the extent (i.e., block sharing of extent). Specifically, each recipient extent map entry points to or references the donor extent map entry. The procedure continues to step 630, where the B+ tree module 186 sends one or more commands to the data deduplication module 184 to perform data deduplication for data associated with donor extent map entry and recipient extent map entries. Specifically, the PVBNs associated with donor and recipient extent map entries are utilized by the data deduplication module 184 to perform data deduplication for the data stored at locations associated with the PVBNs of the recipient. More specifically, the data at the PVBNs associated with the recipient extent map entries can be "scrubbed" or de-duped while maintaining the data associated with the donor extent map entry. That is, the data deduplication procedure, implemented by the deduplication module 184, may modify pointers within indirect blocks to point to a single data block instead of multiple data blocks containing identical data. The procedure ends at step 635.

Figure 7:
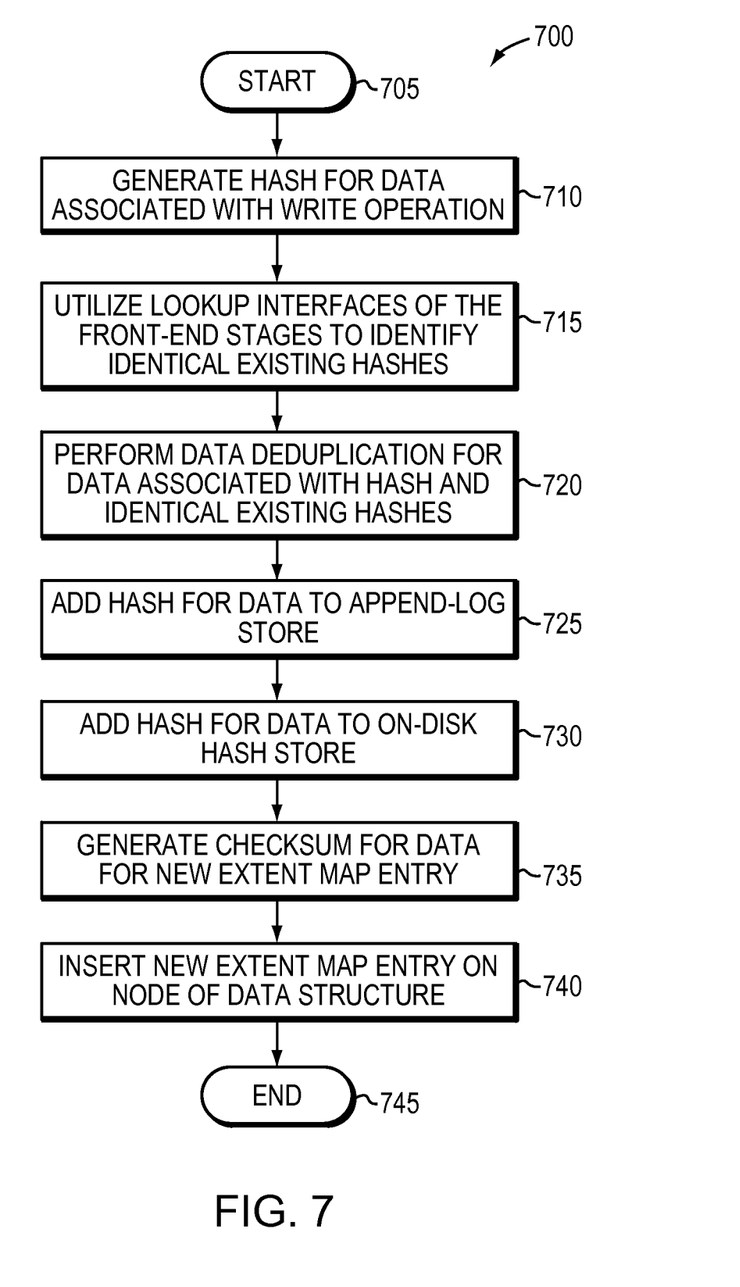
FIG. 7 is a flowchart detailing the steps of a procedure for in-line data deduplication.

FIG. 7 is a flowchart detailing the steps of a procedure 700 for in-line data deduplication. The procedure 700 starts at step 705 and continues to step 710, where a hash (e.g., partial key cuckoo hash) for write data associated with a write operation is generated. At step 715, the lookup interfaces of the front-end stages are utilized to identify one or more identical existing hashes. Specifically, hashes for the data are provided as inputs into the lookup interfaces to identify the one or more existing identical hashes in the append-only log store 480 and/or the on-disk hash store 490. At step 720, data de-duplication is performed for the data associated with hash and the one or more identical existing hashes. The procedure continues to step 725 where the hash is added to the append-only log store 480. The procedure then continues to step 730 where the hash is moved to the on-disk hash store 490 to be batched with other write data.

The procedure continues to step 735 where a checksum (e.g., fingerprint) is generated for the data for a new extent entry 300, by, for example, the fingerprint module 185. Specifically, the checksum of the data represents the checksum bits to be stored in field 302 of the new extent map entry 300 to be inserted into B+ tree data structure 400. The procedure continues to step 740 where the new extent map entry 300 is inserted and stored on a particular leaf node of the B+ tree data structure 400 based on the checksum value, as described above with reference to the flowchart of FIG. 5. The procedure ends at step 745.

It will be apparent that other variations and modifications may be made to the subject matter (disclosure) herein, with the attainment of some or all of their advantages as described herein. It is expressly contemplated that the procedures, processes, and methods described herein may be implemented in alternative orders. Moreover, although reference is made to field 420 storing a value indicating the total number of entries on the leaf node or a the highest duplicate bits value, it is expressly contemplated that field 420 may store an value indicative of the number of extent map entries and/or number of extent map entries having the same checksum bits. Furthermore, the disclosure can be implemented as software (including a computer-readable medium having program instructions executing on a computer), hardware, firmware, or a combination thereof. While this description has been written in terms of a file system, the disclosure may also be utilized with non-file system storage, such as luns and/or other block based storage. Accordingly this description is to be taken only by way of example and not to otherwise limit the scope of the claims. Therefore, it is the object of the appended claims to cover all such variations and modifications as come within the true spirit and scope of the claims.

What is claimed is:

1. A method comprising:
   appending extent identifiers of extents of a storage system into a log;
   based upon a threshold amount of the log being populated with extent identifiers, sorting and moving the extent identifiers into a hash store until expiration of a time period;
   sorting the extent identifiers in the hash store based upon expiration of the time period; and
   moving the extent identifiers from the hash store into a mapping structure mapping extent identifiers to storage location identifiers of corresponding extents.

2. The method of claim 1, further comprising prioritizing deduplication of extents in the storage system based on the mapping structure.

3. The method of claim 1, wherein an extent identifier comprises a checksum generated from an extent and a counter, wherein the counter distinguishes matching checksums.

4. The method of claim 1, wherein the log comprises a key-value store and the hash store comprises a second key-value store, wherein the extent identifiers are the keys and storage location identifiers are the values.

5. The method of claim 1, wherein the storage location identifiers are physical volume block numbers.

6. The method of claim 1, wherein the appending comprises appending extent entries into the log, wherein an extent entry comprises an extent identifier and a corresponding storage location identifier.

7. The method of claim 6, wherein moving the extent identifier from the hash store comprises:
   based on a determination that a node of the mapping structure includes the extent entry with a checksum of the extent identifier of the extent entry, inserting the extent entry from the hash store into the node and updating a score for the node based on a number of the extent entries in the node with a same checksum.

8. The method of claim 7, comprising marking a dirty bit for a second node based on a determination that the second node has a second extent entry with a second checksum matching the checksum of the extent entry being inserted into the node.

9. The method of claim 1, further comprising searching the log with a partial cuckoo hash of an extent based on a write operation to the storage system and performing deduplication based on finding a match.

10. A non-transitory computer-readable medium comprising instructions for performing a method, which when executed by a machine, causes the machine to:
- append extent identifiers of extents of a storage system into a first structure;
- based upon a threshold amount of the log being populated with extent identifiers, sort and move the extent identifiers into a second structure until expiration of a time period;
- sort the extent identifiers in the second structure based upon expiration of the time period; and
- update an extent map database with the extent identifiers from the second structure.

11. The non-transitory computer-readable medium of claim 10, wherein the instructions cause the machine to prioritize deduplication of extents in the storage system based on the extent map database.

12. The non-transitory computer-readable medium of claim 10, wherein an extent identifier comprises a checksum generated from an extent and a counter, wherein the counter distinguishes matching checksums.

13. The non-transitory computer-readable medium of claim 10, wherein the first structure comprises a key-value store and the second structure comprises a second key-value store, wherein the extent identifiers are the keys and storage location identifiers are the values.

14. The non-transitory computer-readable medium of claim 13, wherein the storage location identifiers are physical volume block numbers.

15. The non-transitory computer-readable medium of claim 10, wherein the instructions cause the machine to:
- append extent entries into the first structure, wherein an extent entry comprises an extent identifier and a corresponding storage location identifier.

16. The non-transitory computer-readable medium of claim 15, wherein the instructions cause the machine to:
- based on a determination that a node of an extent map database does not include the extent entry with a checksum of the extent identifier, inserting the extent entry from the first structure into a node of the extent map database.

17. The non-transitory computer-readable medium of claim 16, wherein the instructions cause the machine to mark a dirty bit for a second node based on a determination that the second node has a second extent entry with a second checksum matching the checksum of the extent entry being inserted into the node.

18. The non-transitory computer-readable medium of claim 10, wherein the instructions cause the machine to search the first structure with a partial cuckoo hash of an extent based on a write operation to the storage system and to perform deduplication based on finding a match.

19. A computing device comprising:
- a processor;
- a computer-readable medium comprising instructions executable by the processor to cause the processor to:
- append extent identifiers of extents of a storage system into a first structure;
- based upon a threshold amount of the log being populated with extent identifiers, sort and move the extent identifiers into a second structure until expiration of a time period;
- sort the extent identifiers in the second structure based upon expiration of the time period; and
- update an extent map database with the extent identifiers from the second structure.

20. The computing device of claim 19, wherein the instructions cause the processor to search the second structure with a partial cuckoo hash of an extent based on a write operation to the storage system and to perform deduplication based on finding a match.

* * * * *